United States Patent
Tsang et al.

(10) Patent No.: US 11,436,998 B1
(45) Date of Patent: Sep. 6, 2022

(54) LIGHT LEVEL SENSOR FOR DEVICE WITH DISPLAY

(71) Applicant: Vishay Semiconductor GmbH, Heilbronn D (DE)

(72) Inventors: Koon Wing Tsang, Fremont, CA (US); Jia Yang Koo, San Jose, CA (US); Yuh-Min Lin, San Ramon, CA (US)

(73) Assignee: Vishay Semiconductor GmbH, Heilbronn D (DE)

( * ) Notice: Subject to any disclaimer, the term of this patent is extended or adjusted under 35 U.S.C. 154(b) by 0 days.

(21) Appl. No.: 17/321,011

(22) Filed: May 14, 2021

(51) Int. Cl.
*G09G 5/10* (2006.01)

(52) U.S. Cl.
CPC ....... *G09G 5/10* (2013.01); *G09G 2320/0626* (2013.01); *G09G 2360/141* (2013.01)

(58) Field of Classification Search
None
See application file for complete search history.

(56) References Cited

U.S. PATENT DOCUMENTS

2020/0098336 A1\* 3/2020 Kim .................. G09G 5/10

\* cited by examiner

*Primary Examiner* — Aneeta Yodichkas
(74) *Attorney, Agent, or Firm* — Volpe Koenig

(57) ABSTRACT

Techniques for generating an indication of ambient light intensity are provided. The techniques include obtaining a set of one or more low light level measurements during a low light level display panel period of a display; obtaining a set of one or more high light level measurements during a high light level display panel period of the display; and generating an ambient light level result based on analysis of the set of one or more low light level measurements, the set of one or more high light level measurements, and calibration information.

21 Claims, 4 Drawing Sheets

LIGHT LEVEL SENSOR FOR DEVICE WITH DISPLAY

BACKGROUND

Obtaining a relatively accurate measurement of the amount of ambient light in the vicinity of a device has a wide variety of uses. A variety of effects can cause such measurements to lose accuracy.

BRIEF DESCRIPTION OF THE DRAWINGS

A more detailed understanding can be had from the following description, given by way of example in conjunction with the accompanying drawings wherein.

DETAILED DESCRIPTION

A device includes a light sensor for sensing ambient light. The device also includes a display, such as would be found in a mobile device or other device. The display is capable of producing visual output such as moving images. In some implementations, the light sensor is integrated with the display or is installed under the display. The light sensor takes measurements, but these measurements include contributions from the display. A processor analyzes the measurements along with calibration information to obtain accurate measurements of the ambient light without contributions from the display. The analysis considers measurements taken during different display activity periods—a high light level period and a low light level period—as well as calibration information that is related to the relationship between the light emitted at these different display activity periods. Additional details are provided below. In some examples, the low light level period and the high light level period are periods within a display refresh period. In such examples, the low light level period occurs during a display synchronization signal (e.g., a vertical synchronization signal).

Figure 1:
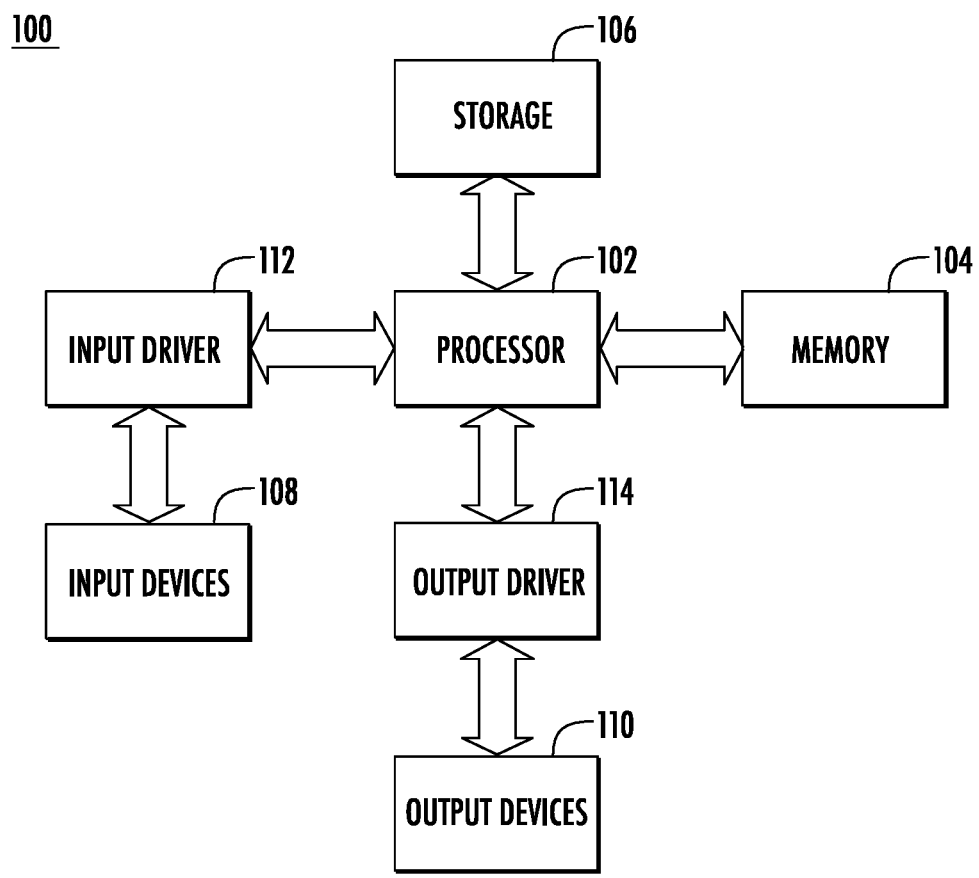
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, server, a tablet computer or other types of computing devices. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid-state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
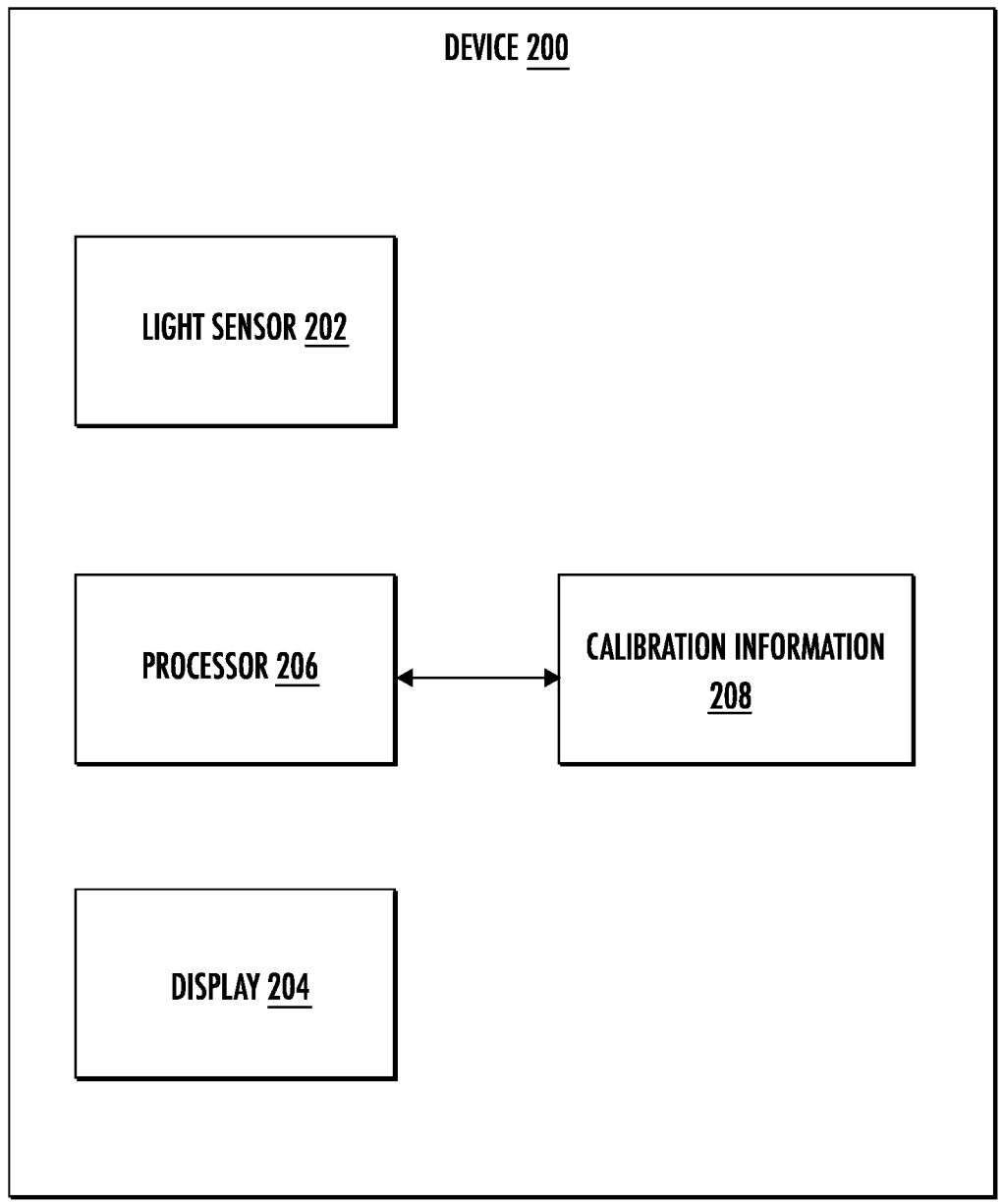
FIG. 2 is a block diagram of a device, according to an example.

FIG. 2 is a block diagram of a device 200, according to an example. In some implementations, the device 200 of FIG. 2 is the device 100 of FIG. 1, and thus in such implementations, FIG. 2 illustrates additional features of the device 100 of FIG. 1. In some examples, the device 200 of FIG. 2 includes some of the features of the device 100 of FIG. 1 or none of the features of the device 100 of FIG. 1.

The device 200 includes a light sensor 202, a processor 206, and a display 204. In some examples, the display 204 is one of the output devices 110. In some examples, the display 204 displays normal device output such as a user interface, media, or other content produced by an operating system and/or applications executing on the device 200. In some examples, the light sensor 202 is one of the input devices 108. In some examples, the processor 206 is implemented as one of software executing on a processor, hardware configured to perform the functionality of the processor 206, or a combination of software or hardware. In some examples, part or all of the functionality of the processor 206 is implemented in the processor 102.

The light sensor 202 senses light intensity in the vicinity of the light sensor 202. Contributions to the light intensity include both emissions from the display 204 as well as ambient light emissions. The ambient light emissions include emissions from various sources. In some situations, the ambient light emissions include contributions from a light source whose intensity varies over time (such as an incandescent light source whose intensity varies with the alternating current signal of a power source), while in other situations, the ambient light emissions do not include such contributions and include contributions from a light source whose output is relatively steady over time. It should be noted that a "relatively stead light source" may vary over time but does not have a periodic variation pattern, such as what would be applied from an alternating current electrical supply.

The processor 206 is pre-calibrated to eliminate the contribution of the display 204 emissions from the ambient light, in order to obtain an accurate measurement of the ambient light intensity. More specifically, the processor 206 has access to calibration information 208 that is indicative of the light emission characteristics of the display 204. To generate a light intensity measurement output indicative of ambient light intensity, the processor 206 uses the calibration information 208 to cancel out the contributions of the display 204 from the measurements taken.

In some implementations, the calibration information 208 includes a modulation function (represented herein sometimes as "a"). The display 204 produces output with an intensity that varies over time. In some implementations, the display has a display low level period, in which the intensity of the display is at a low level and a display high level period, in which the intensity of the display is at a high level. The modulation function includes an indication of the ratio between the intensity of the display during the high level period and the intensity of the display during the low level period, when there is no ambient light in the vicinity of the device 200. In other words, the modulation function is representative of the contribution to the light intensity measured by the light sensor 202 provided by the display 204. More specifically, because the modulation function is a ratio of the high and low intensities of the display 204 with no ambient light present, the modulation function characterizes the contribution of the display 204 to the light measured by the light sensor 202. The processor 206 is thus able to use this modulation function to eliminate the contribution to the measured signal made by the display 204, in order to accurately measure the intensity of the ambient light.

In addition to the above, in some implementations, the modulation function is a function whose value varies based on the brightness of the display. More specifically, the display 204 itself can have varying overall brightness levels. The ratio described above, between the high level period brightness and the low level period brightness, can vary with the overall brightness level of the display 204. Thus in some implementations, the modulation function of the calibration information 208 is embodied as a function of the display brightness that outputs a modulation value $\alpha$, which, again, is the ratio between the high level period brightness and the low level period brightness with no ambient light in the vicinity of the display 204. A variety of effects related to the display 204, such as display type, contribute to the shape of this function. In some examples, the "overall brightness level" refers to a gross brightness set level that is manually adjustable by, for example, a user or is automatically adjustable by, for example, an operating system. In an example, it is possible to set the "brightness" of a smart phone by interfacing with a settings user interface panel and swiping the brightness up or down, which adjusts gross or overall brightness of the screen.

In some examples, the function for the value $\alpha$ is obtained through a calibration process. In some examples, a calibration system (which can be a device similar to device 100, but is not necessarily any device illustrated in the Figures) measures the high level period brightness and low level period brightness while ambient light is minimized (e.g., by covering the display 204) and obtains the ratio for those values. In an example, the device receives a reading from the light sensor 202 while the display 204 is at a high output level, receives a reading from the light sensor 202 while the display 204 is at a low output level, and divides the low measurement by the high measurement to obtain a. The calibration system performs these steps for a number of different overall display 204 brightness levels and records the ratio for each such brightness level. The result is a modulation function with ratio values ("a-values") for a number of different brightness levels.

Figure 3:
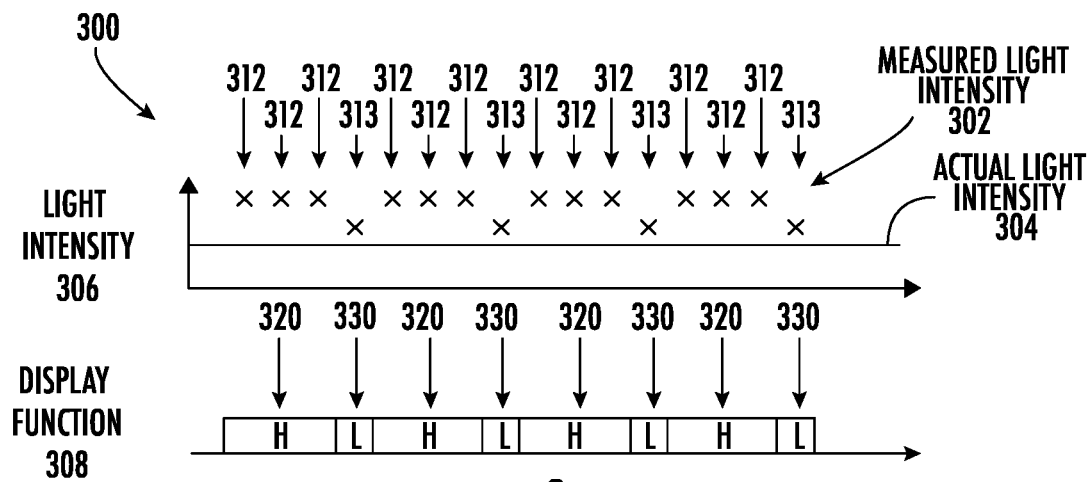
FIG. 3 illustrates a graph showing measured light intensity and ambient light over time, in a situation where ambient light is relatively stable over time.
Figure 4:
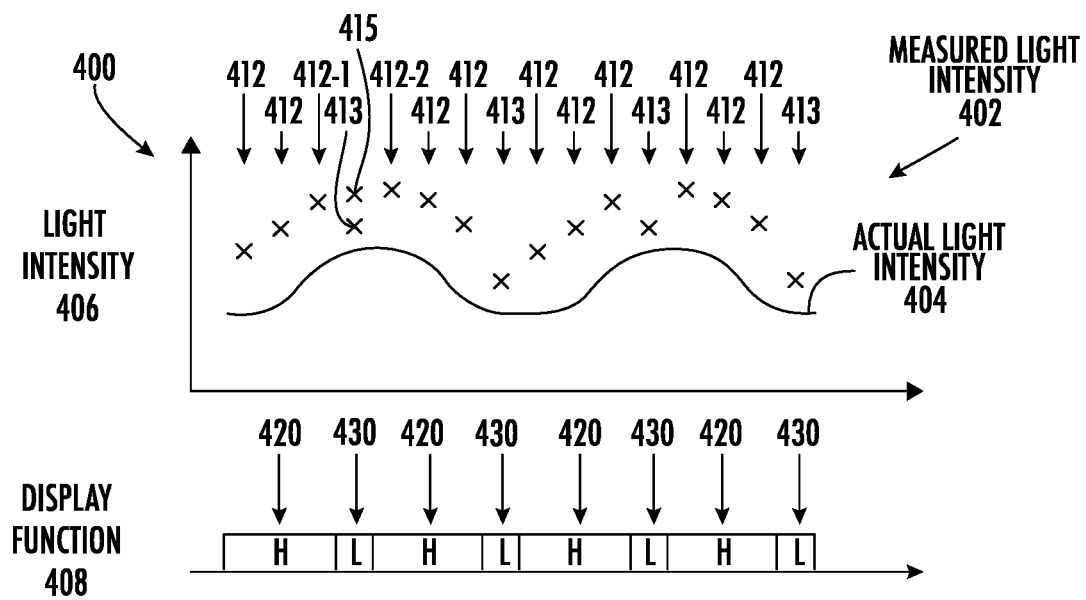
FIG. 4 illustrates a graph showing measured light intensity and ambient light, in a situation where ambient light varies over time.

FIGS. 3 and 4 show example graphs illustrating light intensity measured versus actual ambient light intensity, according to examples. FIG. 3 illustrates a situation where the ambient light has a constant or slowly changing value over time. In FIG. 3, measured light intensity 302 and actual light intensity 304 are plotted on a light intensity graph 306. In addition, display function 308 is also plotted. In the horizontal axis, time advances in the rightward direction.

The display function 308 illustrates two phases of display operation. In a first phase—the high light intensity phase 320, the light intensity emitted by the display 204 is high. In a second phase—the low light intensity phase 330, the light intensity emitted by the display 204 is lower than during the high light intensity phase 320. As stated above, the modulation function is representative of the ratio between the contribution from the display 204 during the low light intensity phase 330 and the contribution from the display 204 during the high light intensity phase 320. It should be noted, however, that in FIGS. 3 and 4, the measured light intensity 302 includes contributions from the ambient light and from the display, since the ambient light is non-zero. In some implementations, the ambient light calculation is based on the measurements 320 and 330 taken within one display 204 data refresh cycle and the modulation function.

The measured light intensity 302 includes high level light measurements 312 and low level light measurements 313. The high level light measurements include contributions from the ambient light and from the display 204 during the high light level period 320. The low level light measurements 313 include contributions from the ambient light and from the display 204 during the low level light period 330. The processor 206 arrives at the actual light intensity 304 by subtracting out the contributions to the measured light intensity 302 made by the display 204, using the modulation function. Additional details are provided below.

FIG. 4 shows a graph 400 illustrating measurements taken with a light source whose intensity that varies over time. The light intensity graph 406 includes a graph showing the actual light intensity 404 and measured light intensities 402. A display function 408 is also shown, illustrating high light level periods 420 and low light level periods 430, which are similar to the high light level period 320 and low light level periods 330 of FIG. 3.

The light intensity measurements 402 include high light level measurements 412, taken when the display 204 has a high level, and low light level measurements 413, taken when the display 204 has a low level. As can be seen, these measurements generally increase and decrease with the increase and decrease with the actual light intensity 404 variations. However, the low light level measurement 413 is generally lower, since the contribution from the display 204 is lower. Again, the processor 206 arrives at the actual light intensity 404 by subtracting out the contributions to the measured light intensity 402 made by the display 204, using the modulation function. Additional details are provided below.

As just stated, the processor 206 uses the modulation function to remove the contribution of the display 204 to the measured light intensity (302/402). Details are now provided. In the following expressions, the symbols used have meanings defined as follows. A: Ambient light. $D_H$: Contribution from the display at the high light level. $D_L$: Contribution from the display at the low light level. $R_1$: Light level measured by the light sensor 202 during the high light level period (320/420). $R_1$ is equal to the ambient light added to the contribution from the display at the high level period. Thus, $R_1 = A + D_H$. $R_2$: Light level measured by the light sensor 202 during the low light level period (330/430). Thus, $R_2 = A + D_L$. B is the overall brightness level of the display. In some examples, this brightness level is a "rough" brightness level that the display is set at. In other words, in some examples, the brightness level is a "gross" brightness level that is settable by a user and/or software. α(B) is the modulation function, which provides the ratio α as a function of brightness B. In some situations in this document, α(B) is sometimes referred to simply as α, but it should be understood that the value α is, in some implementations, based on the brightness B.

As stated above, $R_1 = A + D_H$ and $R_2 = A + D_L$. In addition, $D_L = D_H * α$. Thus, $R_2 = A + αD_H$. $R_1$ and $R_2$ are measurements of the display and a is a known parameter, which is part of the calibration information 208. It is possible to determine the ambient light A based on just these measured values and the calibration information 208 by manipulating the expressions above as follows.

The expression for $R_1$ ($R_1 = A + D_H$) is multiplied by α to arrive at the following expression:

$$αR_1 = αA + αD_H$$

Then, from this expression, the expression for $R_2$ ($R_2 = A + D_H * α$) is subtracted to arrive at the following expression:

$$αR_1 - R2 = α(A + D_H) - 1(A - αD_H) = A(α - 1) + αD_H - αD_H = A(α - 1)$$

Thus:

$$A = \frac{αR_1 - R2}{(α - 1)}$$

Adding $R_1$ and subtracting $$\frac{R1(α - 1)}{α - 1}$$

(which equals $R_1$) nom the right side of the above expression yields:

$$A = R_1 + \frac{R_1 - R_2}{(α - 1)}$$

In some examples, the processor 206 thus uses the above expression, or a mathematically equivalent operation, to determine the ambient light based on the measurements taken and the modulation function.

In some examples, the processor 206 obtains multiple measurements within one display refresh cycle during the high light level period 320/420 and averages these measurements to obtain a value for $R_1$, above. A display refresh cycle is a period of time in which one frame is displayed to the display. In some examples, the processor 206 produces one light level output (i.e., one value of "A") for multiple display frames (i.e., one set of high light level period 320/420 and one low light level period 330/430). In such instances, the processor 206 averages the measured values during the high light level periods to obtain a value for $R_1$ and averages the measured values during the low light level periods to obtain a value for $R_2$. The processor 206 applies these values to the expression above $$\left(A = R_1 + \frac{R_1 - R_2}{(α - 1)}\right)$$

to obtain the value for ambient light.

In some situations, the ambient light varies over time. For example, this can occur when the ambient light is provided by an alternating current powered light source like an incandescent bulb. In these situations, the second instance of the $R_1$ term used on the right side of the above equation is substituted with an estimated high light level term $R_1'$. Thus, the expression for ambient light becomes:

$$A = R_1 + \frac{R_1' - R_2}{(α - 1)}$$

The term $R_1'$ is an estimate that the measured light value would have during the low light level period 330/430 if the display produced a high light level during that period. In some implementations, the processor 206 obtains the value for $R_1'$ by averaging the two high light level values that "border" the low light level period. This "averaging" effectively interpolates those values to arrive at the above-described estimate. In an example, illustrated in FIG. 4, the processor obtains estimated value 415 by averaging values 412-1 and 412-2. The processor 206 still uses the actual measured value for the symbol $R_1$ in the above formula, but uses the estimate for $R_1'$.

Conceptually, use of the estimate $R_1'$ is explained as follows. In the entire expression above, $$A = R_1 + \frac{R_1' - R_2}{(α - 1)},$$

$R_1$ is added to $$\frac{R_1' - R_2}{(α - 1)}.$$

$R_1$ is the actual measurement taken during the high light level period 420. From this value, the right term is "subtracted." Note that the right term in the expression is negative, since α−1 is negative, as α is a value between 0 and 1. Thus adding that term deducts a quantity from the $R_1$ term. This right term is the contribution to the measured light level from the display. Because an average quantity is used for $R_1$, and because the values that are averaged vary over time, such an average quantity would not accurately reflect the contribution of the panel 204 to the measurement in the right term. For example, it could be possible for all measurements taken during the high light level period 420 to be lower than the measurement taken during the low light level period 430, since the ambient light varies with time. In such a situation, the right term would actually be positive and the expression would not remove the contribution of the panel 204 from the measured light level. Using the estimate $R_1'$ thus serves to more accurately produce a term that reflects the contribution of the panel 204.

As with the expression for the situation in which the ambient light does not vary over time, the processor 206 averages multiple measurements 402 taken during the high light level periods 420 to obtain a value for $R_1$. The processor 206 obtains the value for $R_2$ by averaging one or more measurements taken during the low light level period 430. The processor 206 obtains the value for $R_1'$ by averaging or interpolating values taken during the high light level period 420 as described elsewhere herein to obtain the estimated value.

In some examples, the processor 206 determines whether the ambient light is varying with time or is steady. In response, the processor 206 determines whether to select the expression for varying ambient light (i.e., the expression with $R_1'$) or the expression for steady ambient light based on the above determination. In some examples, the processor 206 determines whether the ambient light is varying with time by determining whether the measurements taken during the high light level period 320/420 are varying with time. If these measurements are varying with time, then the ambient light is varying with time and if the measurements are not varying with time, then the ambient light is not varying with time.

In other examples, the processor 206 does not make the above determination and uses the expression for ambient light that is varying with time regardless of whether the light is varying with time. The value produced by averaging the high light level measurements that "border" the low light level period 330/430 would generally be the same as the high light level measurements during the high light level period 320/420.

Figure 5:
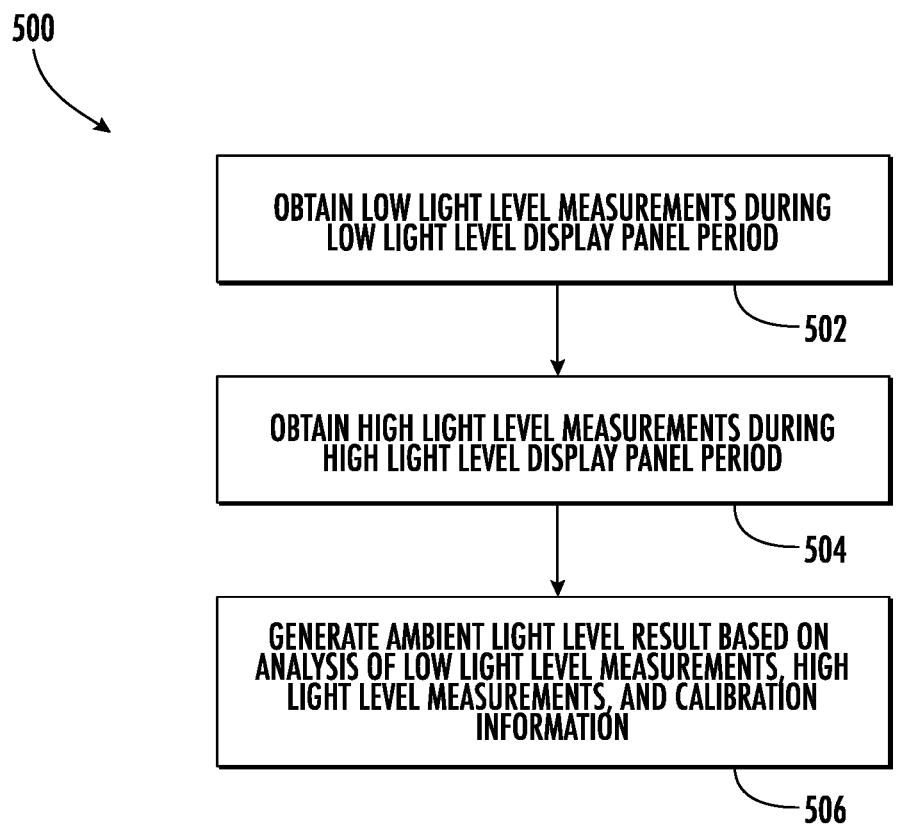
FIG. 5 is a flow diagram of a method for generating an indication of ambient light intensity, according to an example.

FIG. 5 is a flow diagram of a method 500 for generating an indication of ambient light intensity, according to an example. Although the method 500 is described in the context of the system of FIGS. 1-4, those of ordinary skill in the art will understand that any system configured to perform the steps of the method 500 in any technically feasible order falls within the scope of the present disclosure.

The method 500 begins at step 502, where a light sensor 202 obtains low level light measurements during a low light level display panel period. The low light level display panel period is a time period in which the display 204 is emitting a relatively low level of light, which is in contrast with a high light level display panel period, which is a time period in which the display 204 is emitting a relatively high level of light. It should be understood that the display 204 operates in a periodic manner, in which emitted light varies from a high light level to a low light level within one display refresh cycle. In some implementations, the display 204 is powered by a modulated driver that controls brightness through pulse width modulation. In such a scheme, the high light level corresponds to the times that a light for the display 204 is powered on and the low light level corresponds to the times that a light for the display 204 is powered off or to a reduced power. It should be understood that although pulse width modulation is an example of a technique by which a display 204 varies the light level output, any other technique that performs such action is contemplated by the present disclosure.

At step 504, a light sensor 202 obtains high light level measurements during a high light level display panel period. In contrast with the measurements taken at step 502, the measurements taken at step 504 are taken while the light level of the display 204 is at a high level, described elsewhere herein.

At step 506, the processor 206 generates an ambient light level result based on analysis of the low light level measurements, the high light level measurements, and calibration information. The ambient light level result is a measure of the ambient light in the vicinity of the device 200, with the contribution from the display 204 itself canceled out.

In some examples, the processor 206 evaluates an expression to obtain the ambient light level results. In some examples, the expression is one of $$A = R_1 + \frac{R_1' - R_2}{(\alpha - 1)} \text{ or } A = R_1 + \frac{R_1 - R_2}{(\alpha - 1)},$$

where the terms of these expressions are described above. In other examples, the processor 206 uses an expression that is mathematically equivalent or approximately equivalent to these expressions. In general, the processor 206 obtains the ambient light level by taking the high light level period measurements and canceling out the contribution to those measurements provided by the display 204 itself. In the above expressions, the right hand term performs this canceling. The cancelation is derived from measurements during the low light level period, and either an estimation of what the light level would be during the low light level period if the display were outputting light at a high light level ($R_1'$) or an actual measurement taken ($R_1$), as well as calibration information that indicates the relationship between light intensity output by the display 204 during the high light level and low light level periods (e.g., the modulation function a described elsewhere herein). In some examples, the cancelation uses the calibration information to obtain an amount indicative of the contribution of the light panel to the measurements taken by manipulating measurements obtained based on the calibration information. In some examples, the calibration information is a ratio of low display 204 light level taken with no ambient light present to high display 204 light level taken with no ambient light present, as described elsewhere herein. By dividing the difference between a high light level period measurement or estimated high light level period estimation and a low light level period measurement by a value derived from the calibration (in some examples, $\alpha-1$), the processor 206 obtains a cancelation term.

It should be understood that, in some situations or some implementations, the processor 206 obtains the measurement terms ($R_1$, $R_1'$, and $R_2$) used by averaging together multiple individual measurements. For example, the processor 206 obtains multiple measurements taken during the high light period and averages those measurements together to obtain $R_1$. In some implementations, the processor 206 obtains multiple measurements taken during the low light period and averages those measurements together to obtain $R_2$. In some implementations, the processor 206 obtains $R_1'$ by averaging together multiple "bordering" high light level measurements, where the "bordering" measurements are those taken during the high light level period but that are adjacent to the low light level period.

The processor 206 obtains the ambient light level results and forwards it to one or more hardware or software elements to use those values. Any of a wide variety of uses are possible for these measurements. In one example, the processor 206 sends the ambient light level result to an operating system executing on the device 200. The operating system adjusts brightness of the display based on the determined ambient light level, in order to provide appropriate visibility to users of the device 200. In one example, in lower ambient light, a dimmer display is more acceptable, and in higher ambient light, a brighter display is more acceptable. Any other technically feasible uses for the ambient light level result are possible.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the light sensor 202, the processor 206, or the display 204) may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for generating an indication of ambient light intensity, the method comprising:
    obtaining a set of one or more low light level measurements during a low light level display panel period of a display;
    obtaining a set of one or more high light level measurements during a high light level display panel period of the display; and
    generating an ambient light level result based on analysis of the set of one or more low light level measurements, the set of one or more high light level measurements, and calibration information including a modulation function value,
    wherein the modulation function value represents a ratio between an intensity of the display during the low light level display panel period and an intensity of the display during the high light level display panel period when there is no ambient light in the vicinity of the display.

2. The method of claim 1, wherein generating the ambient light level includes:
    obtaining a high light level value indicative of a light level measured during the high light level display panel period;
    canceling, from the high light level value, a panel light contribution value indicative of a contribution to the high light level value from the display.

3. The method of claim 2, wherein obtaining the high light level value comprises averaging together multiple high light level measurements of the set of one or more high light level measurements.

4. The method of claim 2, further comprising:
    obtaining the panel light contribution value based on the set of low light level measurements, the set of high light level measurements, and the calibration information.

5. The method of claim 2, further comprising:
    obtaining the panel light contribution value based on the set of low light level measurements, a light level estimate, and the calibration information.

6. The method of claim 5, further comprising obtaining the light level estimate by averaging together a plurality of high light level measurements of the set of one or more high light level measurements, wherein the plurality of high light level measurements temporally surround the low light level display panel period.

7. The method of claim 2, wherein canceling, from the high light level value, the panel light contribution, comprises:
    adding, to the high light level value, a cancellation value, wherein the cancellation value is or is mathematically equivalent to a difference between the high light level value and a low light level value divided by the modulation function value minus one.

8. The method of claim 2, wherein canceling, from the high light level value, the panel light contribution comprises:
    adding, to the high light level value, a cancellation value, wherein the cancellation value is or is mathematically equivalent a difference between a high light level value estimate and a low light level value divided by the modulation function value minus one.

9. The method of claim 1, further including:
    controlling brightness of the display based on the ambient light level result.

10. The method of claim 1, wherein the modulation function value represents a value obtained during a calibration period in which no light is present in the vicinity of the display.

11. A device comprising:
    a light sensor configured to:
        obtain a set of one or more low light level measurements during a low light level display panel period of a display, and
        obtain a set of one or more high light level measurements during a high light level display panel period of the display; and
    a processor configured to:
        generate an ambient light level result based on analysis of the set of one or more low light level measurements, the set of one or more high light level measurements, and calibration information including a modulation function value, wherein the modulation function value represents a ratio between an intensity of the display during the low light level display panel period and an intensity of the display during the high light level display panel period when there is no ambient light in the vicinity of the display.

12. The device of claim 11, wherein generating the ambient light level includes:
obtaining a high light level value indicative of a light level measured during the high light level display panel period;
canceling, from the high light level value, a panel light contribution value indicative of a contribution to the high light level value from the display.

13. The device of claim 12, wherein obtaining the high light level value comprises averaging together multiple high light level measurements of the set of one or more high light level measurements.

14. The device of claim 12, wherein the processor is further configured to:
obtain the panel light contribution value based on the set of low light level measurements, the set of high light level measurements, and the calibration information.

15. The device of claim 12, wherein the processor is further configured to:
obtain the panel light contribution value based on the set of low light level measurements, a light level estimate, and the calibration information.

16. The device of claim 15, wherein the processor is further configured to: obtain the light level estimate by averaging together a plurality of high light level measurements of the set of one or more high light level measurements, wherein the plurality of high light level measurements temporally surround the low light level display panel period.

17. The device of claim 12, wherein canceling, from the high light level value, the panel light contribution, comprises:
adding, to the high light level value, a cancellation value, wherein the cancellation value is or is mathematically equivalent to a difference between the high light level value and a low light level value divided by the modulation function value minus one.

18. The device of claim 12, wherein canceling, from the high light level value, the panel light contribution comprises:
adding, to the high light level value, a cancellation value, wherein the cancellation value is or is mathematically equivalent a difference between a high light level value estimate and a low light level value divided by the modulation function value minus one.

19. The device of claim 11, wherein the processor is further configured to:
control brightness of the display based on the ambient light level result.

20. The device of claim 11, wherein the modulation function value represents a value obtained during a calibration period in which no light is present in the vicinity of the display.

21. The device of claim 11, wherein the light sensor is disposed under the display.

* * * * *